(12) United States Patent
McGrath

(10) Patent No.: US 8,196,872 B1
(45) Date of Patent: Jun. 12, 2012

(54) ADJUSTABLE BRACKET ASSEMBLY

(76) Inventor: Andrew H. McGrath, Concord, CA (US)

( * ) Notice: Subject to any disclaimer, the term of this patent is extended or adjusted under 35 U.S.C. 154(b) by 356 days.

(21) Appl. No.: 12/639,264

(22) Filed: Dec. 16, 2009

(51) Int. Cl.
*F16L 3/08* (2006.01)
(52) U.S. Cl. .................. 248/65; 248/346.01; 174/65
(58) Field of Classification Search .......... 174/65, 174/654, 669, 668; 248/346.01, 220.21, 248/65
See application file for complete search history.

(56) References Cited

U.S. PATENT DOCUMENTS

| | | |
|---|---|---|
| 54,248 A | 4/1866 | Eddy |
| 147,362 A | 2/1874 | Boudren |
| 255,123 A | 3/1882 | Starrett |
| 257,646 A | 5/1882 | Beseler |
| 342,650 A | 5/1886 | Smith |
| 369,143 A | 8/1887 | White |
| 369,971 A | 9/1887 | Stillman |
| 384,784 A | 6/1888 | Pihl |
| 406,299 A | 7/1889 | Overpack |
| 423,434 A | 3/1890 | Lotto |
| 432,614 A | 7/1890 | Hendrick |
| 462,319 A | 11/1891 | Loehner |
| 476,806 A | 6/1892 | Mauser |
| 502,601 A | 8/1893 | Anderson et al. |
| 546,081 A | 9/1895 | Reyer |
| 551,358 A | 12/1895 | Benecke |
| 554,459 A | 2/1896 | Rockwell |
| 555,025 A | 2/1896 | Ruffhead |
| 557,575 A | 4/1896 | Gibson |
| 560,879 A | 5/1896 | Williams |
| 566,360 A | 8/1896 | White |
| 568,649 A | 9/1896 | Whittington |
| 575,711 A | 1/1897 | Haley |
| 575,857 A | 1/1897 | Sly |
| 576,769 A | 2/1897 | Williams |
| 577,974 A | 3/1897 | Williams |
| 578,014 A | 3/1897 | Homan |
| 581,991 A | 5/1897 | Homan |
| 585,406 A | 6/1897 | Rhind |
| 596,762 A | 1/1898 | Sevison |
| 597,947 A | 1/1898 | Bragger |
| 599,467 A | 2/1898 | Beardsley |
| 600,642 A | 3/1898 | Hartman |
| 621,374 A | 3/1899 | Rhind |
| 625,944 A | 5/1899 | White |
| 632,858 A | 9/1899 | Waibel |
| 642,906 A | 2/1900 | Hedgeland |
| 663,121 A | 12/1900 | Frost |
| 763,380 A | 6/1904 | Eble |
| 767,484 A | 8/1904 | Maltby |
| 795,602 A | 7/1905 | Fyfe |
| 842,007 A | 1/1907 | Parker |
| 842,313 A | 1/1907 | Harrison |

(Continued)

FOREIGN PATENT DOCUMENTS

AU    WO 98/50728 A1    12/1998

*Primary Examiner* — Amy J. Sterling
(74) *Attorney, Agent, or Firm* — Charles L. Thoeming

(57) ABSTRACT

A bracket assembly for securing a longitudinal support member includes a base portion and a dome portion sized and adapted to be threadably engaged around the support member, thereby securing the support member within the bracket assembly. Fasteners in the base portion affix the assembly to a planar surface. The dome portion covers the base portion fasteners when the dome portion has been threaded onto the base portion.

9 Claims, 2 Drawing Sheets

U.S. PATENT DOCUMENTS

| | | |
|---|---|---|
| 874,435 A | 12/1907 | Prescott |
| 926,114 A | 6/1909 | Hall |
| 926,840 A | 7/1909 | Bagaason |
| 959,099 A | 5/1910 | Anderson |
| 963,913 A | 7/1910 | Lyhne |
| 970,751 A | 9/1910 | Pranke |
| 1,047,817 A | 12/1912 | Knight |
| 1,056,574 A | 3/1913 | Newton |
| 1,057,658 A | 4/1913 | Nochols |
| 1,074,272 A | 9/1913 | Kline |
| 1,094,272 A | 4/1914 | Thornley |
| 1,106,486 A | 8/1914 | Becker |
| 1,132,554 A | 3/1915 | Brett |
| 1,137,333 A | 4/1915 | Klorer |
| 1,178,072 A | 4/1916 | Hoag |
| 1,190,050 A | 7/1916 | Verba |
| 1,190,502 A | 7/1916 | Anderson |
| 1,206,871 A | 12/1916 | Locke |
| 1,217,838 A | 2/1917 | Schmidt |
| 1,227,258 A | 5/1917 | Godley |
| 1,231,635 A | 7/1917 | Nelson |
| 1,244,855 A | 10/1917 | Hess |
| 1,266,399 A | 5/1918 | Burtis |
| 1,286,352 A | 12/1918 | Kubat |
| 1,290,252 A | 1/1919 | Lester |
| 1,303,249 A | 5/1919 | Brown |
| 1,303,345 A | 5/1919 | McFeaters |
| 1,324,456 A | 12/1919 | Lutz |
| 1,328,930 A | 1/1920 | Stern |
| 1,345,157 A | 6/1920 | Francisco |
| 1,346,402 A | 7/1920 | Glaudel |
| 1,353,552 A | 9/1920 | Sweet |
| 1,354,873 A | 10/1920 | Bartley |
| 1,356,213 A | 10/1920 | Loyd |
| 1,358,159 A | 11/1920 | Kern |
| 1,358,262 A | 11/1920 | Sumner |
| 1,358,422 A | 11/1920 | D'esopo |
| 1,358,792 A | 11/1920 | Shogran |
| 1,359,645 A | 11/1920 | Zink |
| 1,371,703 A | 3/1921 | Miller |
| 1,372,492 A | 3/1921 | Doyle |
| 1,373,840 A | 4/1921 | Smith |
| 1,375,888 A | 4/1921 | Baer |
| 1,385,485 A | 7/1921 | Comrie |
| 1,386,565 A | 8/1921 | Glaudel |
| 1,389,053 A | 8/1921 | King |
| 1,389,901 A | 9/1921 | Rosenbluth |
| 1,389,935 A | 9/1921 | Carroll |
| 1,393,158 A | 10/1921 | Pawsat |
| 1,393,681 A | 10/1921 | Glaudel |
| 1,399,461 A | 12/1921 | Childs |
| 1,401,402 A | 12/1921 | Hawthorne |
| 1,403,863 A | 1/1922 | Peat |
| 1,408,834 A | 3/1922 | Seavey |
| 1,412,690 A | 4/1922 | Leuckert |
| 1,453,685 A | 4/1922 | Longenbaugh |
| 1,430,379 A | 9/1922 | Hubbell |
| 1,434,714 A | 11/1922 | McMullen |
| 1,435,310 A | 11/1922 | Kipper |
| 1,503,638 A | 1/1923 | Cooper |
| 1,454,390 A | 5/1923 | Loranger |
| 1,460,313 A | 6/1923 | Davis |
| 1,461,289 A | 7/1923 | Primrose |
| 1,461,398 A | 7/1923 | McMullen |
| 1,465,213 A | 8/1923 | Feinberg |
| 1,527,998 A | 9/1923 | Serpico |
| 1,470,553 A | 10/1923 | Church |
| 1,488,986 A | 4/1924 | Hood |
| 1,489,934 A | 4/1924 | Eklund |
| 1,490,304 A | 4/1924 | Zink |
| 1,493,609 A | 5/1924 | Dailey |
| 1,494,033 A | 5/1924 | Stevens |
| 1,504,767 A | 8/1924 | Hodny |
| 1,512,591 A | 10/1924 | McGuire |
| 1,515,867 A | 11/1924 | Masone |
| 1,522,476 A | 1/1925 | Albright |
| 1,538,340 A | 5/1925 | Hodny |
| 1,547,794 A | 7/1925 | Curry |
| 1,558,641 A | 10/1925 | Short |
| 1,574,899 A | 3/1926 | Kellogg |
| 1,580,316 A | 4/1926 | Moreton |
| 1,590,562 A | 6/1926 | Blonigen |
| 1,597,943 A | 8/1926 | Wilhelm |
| 1,706,215 A | 3/1929 | Davidson |
| 1,721,271 A | 7/1929 | Du Prel |
| 1,732,534 A | 10/1929 | Riches |
| 1,735,212 A | 11/1929 | Pawsat |
| 1,737,214 A | 11/1929 | Brown |
| 1,745,695 A | 2/1930 | Hunter |
| 1,989,691 A | 11/1930 | Hirt |
| 1,793,911 A | 2/1931 | Dann |
| 1,814,500 A | 7/1931 | Summerbell |
| 1,835,473 A | 12/1931 | Davidson |
| 1,849,001 A | 3/1932 | Fisher |
| 1,936,529 A | 6/1932 | Taylor |
| 2,010,058 A | 6/1932 | Carlson |
| 1,941,032 A | 12/1933 | Knowles |
| 2,073,089 A | 3/1935 | Autenrieth |
| 2,038,906 A | 4/1936 | Ruhland |
| 2,066,699 A | 1/1937 | Skelton |
| 2,074,247 A | 3/1937 | Armstrong |
| 2,124,006 A | 7/1938 | Parker |
| 2,163,859 A | 6/1939 | Ver Bockel |
| 2,177,921 A | 10/1939 | Zofrey |
| 2,220,429 A | 11/1940 | Scderberg |
| 2,315,132 A | 4/1941 | Powers |
| 2,290,874 A | 6/1941 | Graff |
| 2,258,175 A | 11/1941 | Coleman |
| 2,287,890 A | 6/1942 | Legassey |
| 2,370,748 A | 4/1943 | O'Donnell |
| 2,338,124 A | 1/1944 | Martinek |
| 2,365,935 A | 12/1944 | Boggs |
| 2,433,550 A | 9/1945 | Graham |
| 2,456,505 A | 12/1948 | Hastings |
| 2,635,345 A | 1/1949 | Samborski |
| 2,511,590 A | 6/1950 | Keck |
| 2,548,650 A | 4/1951 | Brandt |
| 2,567,593 A | 9/1951 | Bemis |
| 2,596,627 A | 5/1952 | Wahnish |
| 2,696,996 A | 7/1952 | Engelhardt |
| 2,651,725 A | 9/1953 | McFarland |
| 2,719,691 A | 10/1955 | Vance |
| 2,733,035 A | 1/1956 | Rocheleau |
| 2,767,003 A | 10/1956 | Gilmont |
| 2,783,015 A | 2/1957 | Kampa |
| 3,026,162 A | 4/1960 | Waszkiewicz |
| 2,970,798 A | 2/1961 | Fritchle |
| 3,003,813 A | 10/1961 | Bolenbach |
| 3,069,189 A | 12/1962 | Hollaender |
| 3,073,660 A | 1/1963 | Schultz |
| 3,096,109 A | 7/1963 | Callahan |
| 3,118,695 A | 1/1964 | Engelhardt |
| 3,126,100 A | 3/1964 | Christensen |
| 3,126,191 A | 3/1964 | Holden |
| 3,160,349 A | 12/1964 | Kent |
| 3,237,899 A | 3/1966 | Lewis |
| 3,265,434 A | 8/1966 | Bolotin |
| 3,269,683 A | 8/1966 | Shinaver |
| D206,162 S | 11/1966 | Molitor |
| D206,198 S | 11/1966 | Molitor |
| 3,389,882 A | 6/1968 | Schlosser |
| 3,405,587 A | 10/1968 | Meazzi |
| 3,484,066 A | 12/1969 | Aunspaugh |
| 3,499,697 A | 3/1970 | Olander |
| 3,500,594 A | 3/1970 | O'Brien |
| 3,543,312 A | 12/1970 | Pofferi |
| 3,581,354 A | 6/1971 | Usiskin |
| 3,610,562 A | 10/1971 | Holmes |
| 3,640,498 A | 2/1972 | Aleks |
| 3,734,439 A | 5/1973 | Wintz |
| 3,738,606 A | 6/1973 | Millen |
| 3,837,383 A | 9/1974 | Ko |
| 3,843,083 A | 10/1974 | Angibaud |
| 4,047,684 A | 9/1977 | Kobayashi |
| 4,050,661 A | 9/1977 | Wooldridge |
| 4,115,966 A | 9/1978 | Delee |
| 4,126,081 A | 11/1978 | Zdeb |

| | | | | | | |
|---|---|---|---|---|---|---|
| 4,132,178 A | 1/1979 | Mueller et al. | D330,555 S | 10/1992 | Lilly | |
| 4,162,647 A | 7/1979 | Aslen | D332,497 S | 1/1993 | Shufelt | |
| 4,237,798 A | 12/1980 | Welsch et al. | 5,199,680 A | 4/1993 | Rivera | |
| 4,250,348 A * | 2/1981 | Kitagawa ................... 174/655 | D337,462 S | 7/1993 | LaVaute et al. | |
| 4,307,864 A | 12/1981 | Benoit | 5,259,582 A | 11/1993 | DeLange | |
| 4,338,875 A | 7/1982 | Lisowski | 5,361,251 A * | 11/1994 | Aihara et al. ................ 370/252 | |
| 4,358,079 A * | 11/1982 | Navarro ........................ 248/56 | 5,409,122 A | 4/1995 | Lazarus | |
| 4,443,128 A | 4/1984 | Yamamoto | 5,449,138 A | 9/1995 | Ciancio | |
| 4,452,416 A | 6/1984 | Templeton | 5,566,911 A | 10/1996 | Hoshino | |
| 4,483,334 A | 11/1984 | Murray | 5,584,545 A | 12/1996 | LaVaute et al. | |
| 4,511,158 A | 4/1985 | Varga | 5,589,903 A | 12/1996 | Speggiorin | |
| 4,547,092 A | 10/1985 | Vetter | D377,429 S | 1/1997 | Olson | |
| 4,624,374 A | 11/1986 | Murtaugh | 5,681,017 A | 10/1997 | Clausen | |
| 4,729,535 A | 3/1988 | Frazier | 5,704,232 A | 1/1998 | Kuo | |
| 4,738,636 A * | 4/1988 | Bolante ........................ 439/462 | 5,735,499 A | 4/1998 | Phillips | |
| 4,739,126 A * | 4/1988 | Gutter et al. ................... 174/78 | 5,746,334 A | 5/1998 | Brandenberg | |
| 4,747,569 A | 5/1988 | Hoshino | 5,775,652 A | 7/1998 | Crawshaw | |
| 4,799,444 A | 1/1989 | Lisowski | 5,823,102 A | 10/1998 | Will | |
| 4,799,818 A | 1/1989 | Sudimak et al. | 5,826,850 A | 10/1998 | Goldsmith | |
| 4,821,382 A | 4/1989 | Puschkarski | 5,974,984 A | 11/1999 | Mitjans | |
| 4,884,927 A | 12/1989 | Menker | 6,093,878 A | 7/2000 | Hoshino | |
| 4,892,366 A | 1/1990 | Yerman | 6,132,018 A | 10/2000 | McGrath | |
| D309,540 S | 7/1990 | Settles et al. | 6,328,269 B1 | 12/2001 | Krautloher | |
| 4,964,603 A | 10/1990 | Yair | 6,350,955 B1 * | 2/2002 | Daoud ........................ 174/651 | |
| 4,976,486 A | 12/1990 | Rifaat | 6,588,863 B1 | 7/2003 | Yatchak et al. | |
| 5,002,247 A | 3/1991 | Dispenza et al. | 6,890,006 B2 * | 5/2005 | Crestin et al. ................ 285/342 | |
| 5,023,755 A | 6/1991 | Rosenberg | D625,170 S | 10/2010 | McGrath | |
| 5,056,854 A | 10/1991 | Rosen | D625,984 S | 10/2010 | McGrath | |
| 5,068,496 A * | 11/1991 | Favalora ........................ 174/654 | D636,658 S | 4/2011 | McGrath | |
| 5,082,334 A | 1/1992 | Beyer et al. | 7,922,511 B1 * | 4/2011 | Schweitzer et al. .......... 439/314 | |
| 5,111,956 A | 5/1992 | Jow | 7,963,567 B2 * | 6/2011 | Gallardo et al. ........... 285/140.1 | |
| 5,128,838 A | 7/1992 | Brandess | | | | |

* cited by examiner

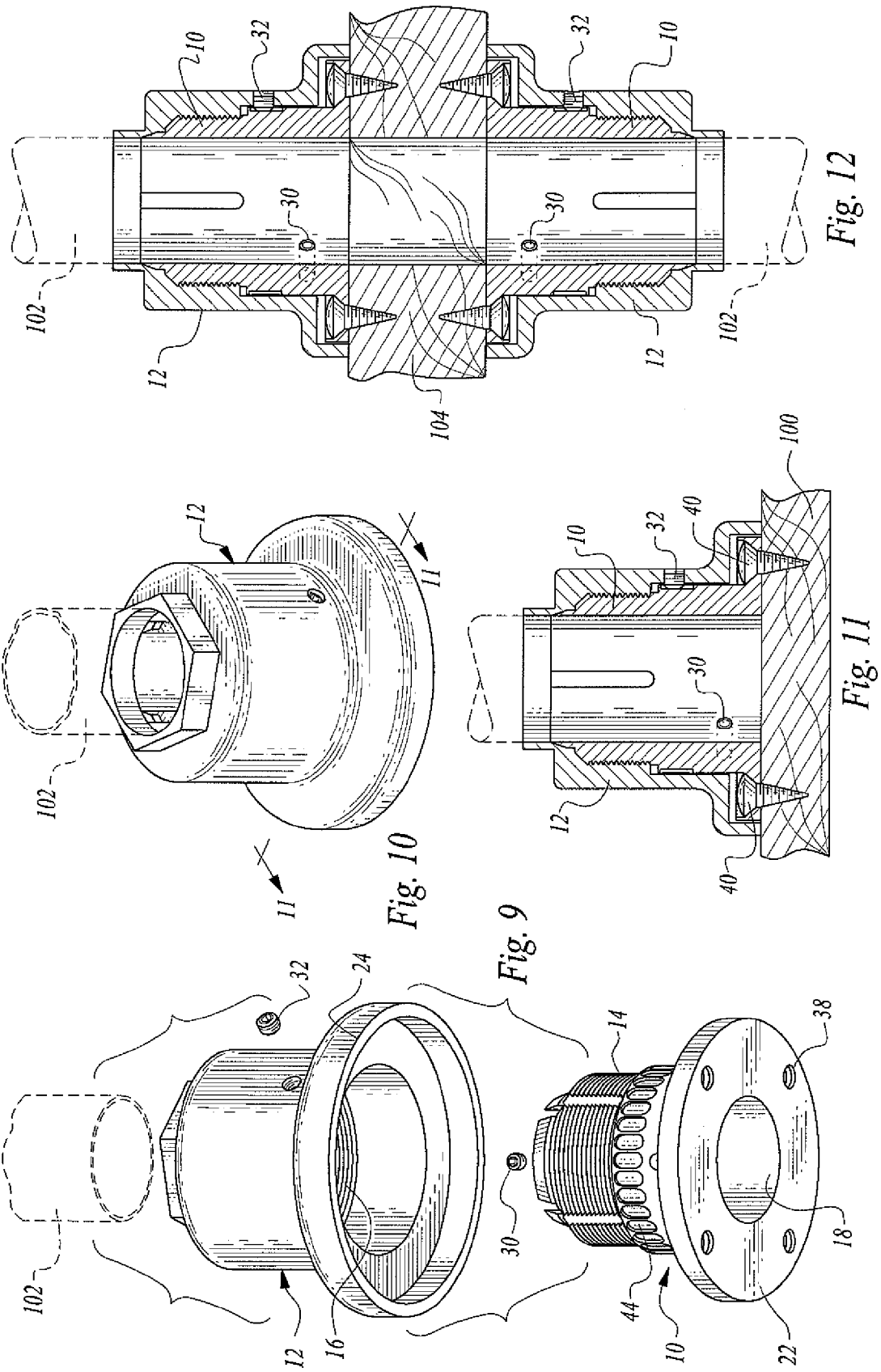

ADJUSTABLE BRACKET ASSEMBLY

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to ready-to-assemble components used in adjustable bracket assemblies for adapting to and connecting one or more substantially external support member(s) defined by the particular utility of the overall assembly to a fixed support structure. Such ready-to-assemble components can be typically, but not exclusively, employed to releasably affix a plurality of longitudinally oriented support members to at least one fixed support structure.

BACKGROUND OF THE INVENTION

Adjustable height supports and bracketing are well known in the art and typically comprise an upright or support member, some separate assembly for supporting a platform or similar assembly, apparatus for moving the separate assembly along the upright or support member, and an assembly for securing the upright or support member.

Designing and assembling these elements is ordinarily complicated since dimensions, load factors, code requirements, and aesthetics converge to present brackets which are labor and component intensive. Often bracketing assemblies will have many component parts and require several tools for assembly. Moreover, with current technology, bracket assembly requires more than one person and is time consuming.

Many ready to assemble bracket assemblies utilize location dependent uprights or support members that multiply the effort needed to design and assembly the bracketing components and that intensify the complexity of the process. Presently most bracketing assemblies are installed by the seller because of the complexity of assembling. Thus, many bracketing assemblies are handled fully or most fully assembled which presents bulky cargo that takes up considerable amount of space and is difficult to transport.

Additionally, when one part of a piece of bracketing assembly is damaged, often the entire product must be returned instead of the damaged part. For example, when an upright or support member fails or is defective, often the entire bracketing assembly must be replaced.

Finally, the bracket assembly needs to be supported by adequate and aesthetically pleasing attachment components for securing the assembly to one or more fixed support structures.

DISCLOSURE OF INVENTION

The present invention relates to adjustable bracketing assemblies that can be employed readily over a wide array of bracketing applications to securely connect a variety of longitudinally oriented support members to at least one fixed support structure, while still satisfying the complement of requirements presented by dimensions, load factors, codes, and design preferences. Furthermore, the bracketing apparatus disclosed and claimed herein has been fashioned in such a manner as to maximize its utility over a broad range of applications, while minimizing the labor, parts and tools required for implementation. Since the apparatus is characterized by its universality and relative simplicity and ease of installation, it serves to fulfill both original and retrofit bracketing applications. The adjustability feature of the apparatus means that less "design customizing" is required for a given installation, thus leading to demonstrable cost savings.

The adjustable bracketing assembly includes connector apparatus for mounting and securing longitudinally oriented support members to at least one fixed support structure, and allowing for positional adjustment of the longitudinally oriented support members along the support member longitudinal axis.

The adjustable bracketing assembly provides a base portion having a foot element and an externally threaded element sized to receive and hold a longitudinally oriented support member. The base portion is affixed to a planar surface of a fixed support structure by fasteners through a plurality of openings through the base portion foot element. A dome portion is sized to be threaded onto the base portion and to receive the longitudinally oriented support member to secure the support member to the base portion and cover the fasteners attaching the base portion to the planar surface.

Other features, advantages, and objects of the present invention will become apparent with reference to the following description and accompanying drawings.

BRIEF DESCRIPTION OF DRAWINGS

FIG. 9 is an exploded perspective view of the bracket assembly base portion 10 and dome portion 12.

FIG. 10 is perspective view of the bracket assembly of FIG. 9 depicting the dome portion 12 threaded onto the base portion 10 with a longitudinal support member locked into the base portion 10 externally threaded, compression flange element 14.

FIG. 11 is a section view of FIG. 10 taken at "11-11."

FIG. 12 is a section view of dual bracket assemblies securing a single longitudinal support member 102 on both sides of a planar fixed support structure 100 through which the longitudinal support member 102 extends.

MODES FOR CARRYING OUT THE INVENTION

Figure 1:
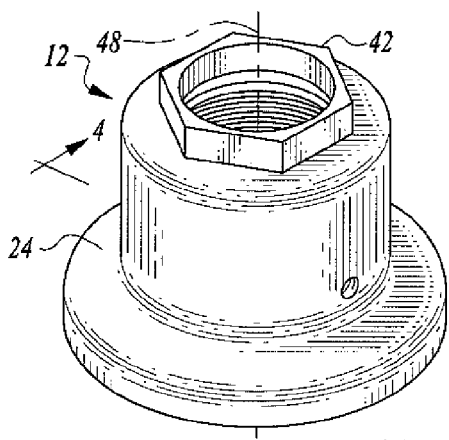
FIG. 1 is a perspective view of the bracket assembly dome portion 12.
Figure 5:
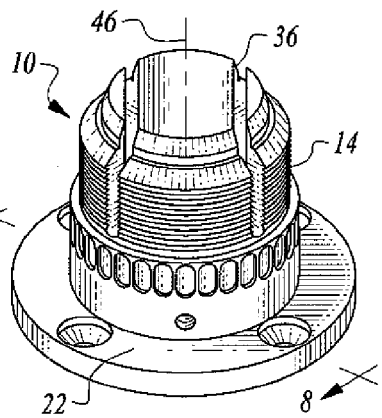
FIG. 5 is a perspective view of the bracket assembly base portion 10.
Figure 2:
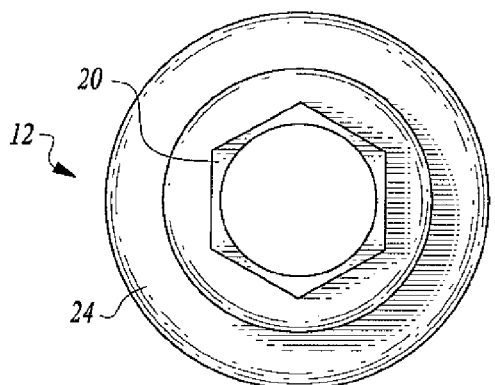
FIG. 2 is a top view of the bracket assembly dome portion 12 of FIG. 1.
Figure 6:
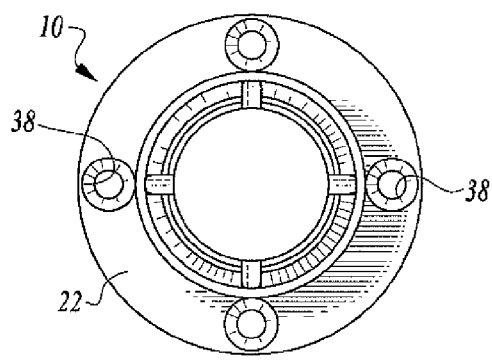
FIG. 6 is a top view of the bracket assembly base portion 10 of FIG. 5.
Figure 3:
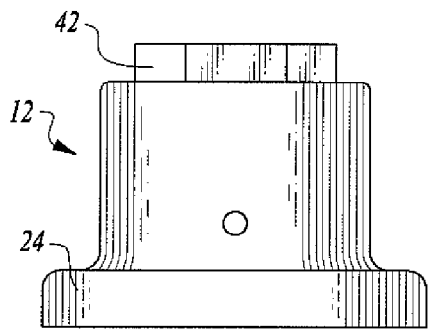
FIG. 3 is an elevation view of the bracket assembly dome portion 12 of FIG. 1 depicting the dome portion 12 height dimension.
Figure 7:
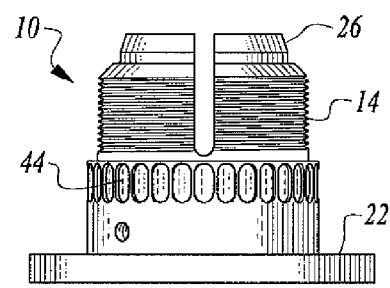
FIG. 7 is an elevation view of the bracket assembly base portion 10 of FIG. 5 depicting the base portion 10 height dimension.
Figure 4:
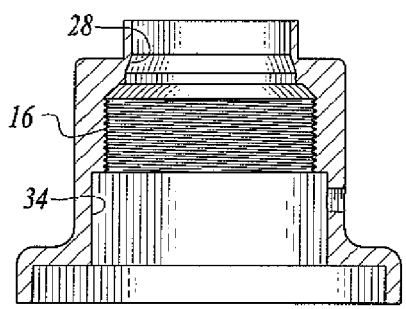
FIG. 4 is a section view of the bracket assembly dome portion 12 of FIG. 1 taken at "4-4."
Figure 8:
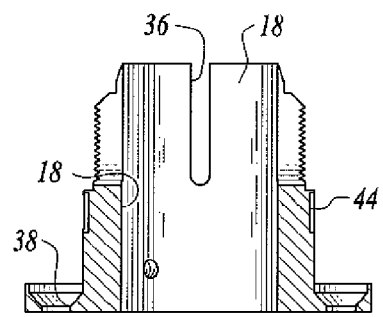
FIG. 8 is a section view of the bracket assembly base portion 10 of FIG. 5 taken at "8-8"

Referring now to FIGS. 1-12, base portions and dome portions for a bracket assembly are illustrated and designated by reference numerals 10 and 12, respectively.

A bracket assembly includes a base portion 10 having a predetermined height dimension and a central longitudinal axis. The base portion 10 has an externally threaded, compression flange element 14 sized to receive a longitudinal support member 102 along the base portion central longitudinal axis 46. The base portion externally threaded, compression flange element 14 has a mitered top end 26. The base portion 10 externally threaded, compression flange element 14 provides a plurality of slotted elements 36 disposed equal distant and parallel to the base portion longitudinal central axis and at equal angles along a plane perpendicular to the base portion longitudinal central axis.

The base portion 10 further includes an internal diameter element 18 centered on the base portion longitudinal axis 46 and running the through the entire height of the base portion 10, FIGS. 5-8.

A foot element 22 of the base portion 10 has a plurality of openings 38 through the base portion 10 foot element 22. The base portion 10 foot element 22 openings 38 are equal distant from the base portion longitudinal axis 46 and disposed at equal angles along a plane perpendicular to the base portion longitudinal axis 46. The openings are sized to receive fasteners 40 to affix the base portion 10 to a fixed support structure 100. In an embodiment, the openings 38 are countersunk and the fasteners 40 are screws sized to fit within the countersunk openings, FIGS. 11-12.

The base portion 10 also includes a circumferential locking element band 44 between the externally threaded, compression flange element 14 and foot element 22. The base portion 10 circumferential locking element band 44 is sized to receive and secure the dome portion 12 second internal diameter element 34 assembly for locking onto the base portion 10 and sized to receive the dome portion 12 assembly for locking onto the circumferential locking element band 44. An embodiment provides an assembly for locking the base portion 10 onto the longitudinal support member 102 that includes a set screw 30 with an Allen-head tool fitting, positioned between the base portion 10 circumferential locking element band 44 and the base portion 10 foot element 22, FIGS. 5, 7 and 9.

The bracket assembly further includes a corresponding dome portion 12 having a predetermined height dimension and a central longitudinal axis 48. The dome portion 12 has an internally threaded element 16 sized to receive the longitudinal support member 102 along the dome portion 12 longitudinal axis 48. The dome portion 12 internally threaded element 16 further includes internal threads sized to receive and correspond to the base portion 10 externally threaded, compression flange element 14. The dome portion 12 internally threaded element 16 includes a first internal diameter element 20 centered on the dome portion longitudinal axis and having a diameter dimension equal to the base portion 10 internal diameter element 18.

The dome portion 12 includes a second internal diameter element 34 centered on the dome portion 12 longitudinal axis 48 below the dome portion 12 internally threaded element 16 first internal diameter 20, the dome portion 12 second internal diameter 34 element being larger than the dome portion first internal diameter element and includes an assembly for locking onto the base portion 10 circumferential locking element band 44. In an embodiment, the assembly for locking onto the base portion circumferential locking element band 44 includes a set screw 32 with an Allen-head tool fitting.

The dome portion 12 further provides a tool fitting 42 on an external top surface. In an embodiment, the tool fitting 42 on the dome portion 12 top surface is a hexagonal nut, FIGS. 1-3.

The dome portion 12 internally threaded element 16 further provides a mitered top end element 28 sized to correspond to and receive the base portion 10 externally threaded, compression flange element 14 mitered top end 26 such that the base portion 10 and dome portion 12 longitudinal axes, 46 and 48 respectively, are aligned as the dome portion 12 is threaded onto the base portion 10.

The dome portion 12 further includes a foot element 24 sized to receive and cover the base portion 10 foot element 22 when the dome portion 12 threaded element 16 is threaded on and tightened to the base portion 10 externally threaded, compression flange element 14.

When the base portion 10 is attached to the fixed support structure 100, the base portion 10 and dome portion 12 longitudinal axes are aligned, 46 and 48 respectively, and the longitudinal support member 102 received by the base portion 10 and the dome portion 12 is secured to the fixed support structure by tightening the dome portion 12 threaded element 16 on the base portion 10 externally threaded, compression flange element 14. As such, the dome portion 12 foot element 24 covers and conceals the base portion 10 foot element 22 and fasteners 40 affixed to the fixed support structure 100, FIG. 11.

The bracket assembly can be affixed to both a top and bottom fixed support surface 100 for added strength and stability for a longitudinal support member 102 extending through the fixed support surface 100, FIG. 12. This embodiment also provides a multiple range of adjustment in the length of the support member above the fixed support surface, providing numerous reconfigurations of the overall bracket assembly superstructure.

The base portion 10 and the dome portion 12 are separate, unitary pieces preferably made of a strong metal such as aluminum or steel, or high strength carbon materials such as carbon fiber and carbon fiber—reinforced polymer. The exterior surfaces of the dome portion 12 may be provided with a plastic or resinous coating for aesthetic purposes.

Therefore, the foregoing is considered as illustrative only of the principles of the bracket assembly. Additionally, since numerous modifications and changes will readily occur to those skilled in the art, it is not desired to limit the bracket assembly to the exact construction and operation shown and described, and further, all suitable modifications and equivalents may be resorted to, falling within the scope of the bracket assembly.

I claim:
1. A bracket assembly comprising, in combination:
 a) a unitary base portion comprising:
   (i) a height;
   (ii) a central longitudinal axis;
   (iii) an externally threaded, compression flange element sized to receive a longitudinal support member along the base portion central longitudinal axis;
   (iv) a plurality of openings through a base portion foot element, the openings situated at equal distances from the base portion longitudinal axis, disposed at equal angles along a plane perpendicular to the base portion longitudinal axis, and sized to receive and be secured to a fixed a fixed support structure by a single countersunk fastener through each opening;
   (v) an internal diameter element centered on the base portion longitudinal axis and extending the entire height of the base portion;
   (vi) a circumferential locking element band between the externally threaded, compression flange element and base portion foot element;

(vii) a mitered base portion externally threaded, compression flange element top end;

(viii) a plurality of slotted elements disposed in the externally threaded, compression flange element equal distant and parallel to the base portion longitudinal central axis and at equal angles along a plane perpendicular to the base portion longitudinal central axis; and (ix) separate, second means for locking onto the longitudinal support member; and b) a unitary dome portion comprising:

(i) a height;

(ii) a central longitudinal axis;

(iii) an internal element sized to receive the longitudinal support member along the dome portion longitudinal axis and comprising internal threads sized to receive and correspond to the externally threaded, compression flange element;

(iv) a first internal diameter element centered on the dome portion longitudinal axis and having a diameter dimension equal to the base portion internal diameter element;

(v) a second internal diameter element centered on the dome portion longitudinal axis below the dome portion internally threaded element first internal diameter, the dome portion second internal diameter element being larger than the dome portion first internal diameter element and comprising means for locking onto the base portion circumferential locking element band;

(vi) a mitered dome portion internally threaded element top end sized to correspond to and receive the base portion externally threaded, compression flange element mitered top end such that the base portion and dome portion longitudinal axes are aligned;

(vii) a hexagonal nut tool fitting on a dome portion external top surface; and (viii) a dome portion foot element sized to correspond to and fit over the base portion foot element.

2. A bracket assembly comprising, in combination:

a) a base portion comprising a height, a central longitudinal axis, an externally threaded, compression flange element sized to receive a longitudinal support member along the base portion central longitudinal axis, means for securely attaching the base portion to a fixed support structure, a locking assembly between the externally threaded, compression flange element and means for securely attaching the base portion to a fixed support structure, the locking assembly sized to receive and secure an internal dome portion for locking onto the base portion, a base portion foot element, a plurality of openings through the base portion foot element, the openings equal distant from the base portion longitudinal axis and disposed at equal angles along a plane perpendicular to the base portion longitudinal axis, and means for securing the base portion foot element to the fixed support structure through each opening through the base portion foot element; and b) a dome portion comprising a height, a central longitudinal axis, an internally threaded element sized to receive the longitudinal support member along the dome portion longitudinal axis, internal threads sized to receive and correspond to the externally threaded, compression flange element, and a foot element sized to receive and cover the base portion foot element when the dome portion threaded element is threaded on and tightened to the base portion externally threaded, compression flange element;

such that, when the base portion is attached to the fixed support structure, the base portion and dome portion longitudinal axes are aligned, and the longitudinal support member received by the base portion and the dome portion is secured to the fixed support structure by tightening the dome portion threaded element on the base portion externally threaded, compression flange element.

3. A bracket assembly comprising, in combination:

a) a base portion comprising a height, a central longitudinal axis, an externally threaded, compression flange element sized to receive a longitudinal support member along the base portion central longitudinal axis, means for securely attaching the base portion to a fixed support structure, a locking assembly between the externally threaded, compression flange element and means for securely attaching the base portion to a fixed support structure, the locking assembly sized to receive and secure an internal dome portion for locking onto the base portion, a base portion foot element, a plurality of openings through the base portion foot element, the openings equal distant from the base portion longitudinal axis and disposed at equal angles along a plane perpendicular to the base portion longitudinal axis, means for securing the base portion foot element to the fixed support structure through each opening through the base portion foot element, and an internal diameter element centered on the base portion longitudinal axis and running the through the entire height of the base portion; and b) a dome portion comprising a height, a central longitudinal axis, an internally threaded element sized to receive the longitudinal support member along the dome portion longitudinal axis and comprising a first internal diameter element centered on the dome portion longitudinal axis and having a diameter dimension equal to the base portion internal diameter element, internal threads sized to receive and correspond to the externally threaded, compression flange element, a second internal diameter element centered on the dome portion longitudinal axis below the dome portion internally threaded element first internal diameter, the dome portion second internal diameter element being larger than the dome portion first internal diameter element and comprising means for locking onto the base portion, and a foot element sized to receive and cover the base portion foot element when the dome portion threaded element is threaded on and tightened to the base portion externally threaded, compression flange element;

such that, when the base portion is attached to the fixed support structure, the base portion and dome portion longitudinal axes are aligned, and the longitudinal support member received by the base portion and the dome portion is secured to the fixed support structure by tightening the dome portion threaded element on the base portion externally threaded, compression flange element.

4. A bracket assembly comprising, in combination:

a) a base portion comprising a height, a central longitudinal axis, an externally threaded, compression flange element sized to receive a longitudinal support member along the base portion central longitudinal axis, means for securely attaching the base portion to a fixed support structure, a locking assembly between the externally threaded, compression flange element and means for securely attaching the base portion to a fixed support structure, the locking assembly comprising a circumferential locking element band between the externally threaded, compression flange element and means for securely attaching the base portion to a fixed support structure, wherein the circumferential locking element band is sized to receive and secure a dome portion second internal diameter element means for locking onto the base portion, a base portion foot element, a plurality of openings through the base portion foot element, the openings equal distant from the base portion longitudinal axis and disposed at equal angles along a plane perpendicular to the base portion longitudinal axis, means for securing the base portion foot element to the fixed support structure through each opening through the base portion foot element, and an internal diameter element centered on the base portion longitudinal axis and running the through the entire height of the base portion; and b) a dome portion comprising a height, a central longitudinal axis, an internally threaded element sized to receive the longitudinal support member along the dome portion longitudinal axis and comprising a first internal diameter element centered on the dome portion longitudinal axis and having a diameter dimension equal to the base portion internal diameter element, internal threads sized to receive and correspond to the externally threaded, compression flange element, a second internal diameter element centered on the dome portion longitudinal axis below the dome portion internally threaded element first internal diameter, the dome portion second internal diameter element being larger than the dome portion first internal diameter element and comprising means for locking onto the base portion, and a foot element sized to receive and cover the base portion foot element when the dome portion threaded element is threaded on and tightened to the base portion externally threaded, compression flange element;

such that, when the base portion is attached to the fixed support structure, the base portion and dome portion longitudinal axes are aligned, and the longitudinal support member received by the base portion and the dome portion is secured to the fixed support structure by tightening the dome portion threaded element on the base portion externally threaded, compression flange element.

5. The bracket assembly according to claim 2, wherein the base portion externally threaded, compression flange element further comprises a mitered top end.

6. The bracket assembly according to claim 5, wherein the dome portion internally threaded element further comprises a mitered top end sized to correspond to and receive the base portion externally threaded, compression flange element mitered top end such that the base portion and dome portion longitudinal axes are aligned.

7. The bracket assembly according to claim 2, wherein the base portion externally threaded, compression flange element comprises a plurality of slotted elements disposed equal distant and parallel to the base portion longitudinal central axis and at equal angles along a plane perpendicular to the base portion longitudinal central axis.

8. The bracket assembly according to claim 2, wherein the base portion comprises a separate, second means for locking onto the longitudinal support member.

9. The bracket assembly according to claim 2, wherein the dome portion internally threaded element comprises a tool fitting on an external top surface.

\* \* \* \* \*